United States Patent [19]

Castleman

[11] 4,082,920
[45] Apr. 4, 1978

[54] TELEPHONE TESTING EQUIPMENT

[75] Inventor: Cordell V. Castleman, Bloomington, Minn.

[73] Assignee: Magnetic Controls Company, Minneapolis, Minn.

[21] Appl. No.: 703,909

[22] Filed: Jul. 9, 1976

[51] Int. Cl.² .................................... H04M 11/06
[52] U.S. Cl. ....................... 179/2 DP; 179/84 VF; 307/261; 179/175.2 A
[58] Field of Search ........ 179/175.2 A, 2 DP, 84 VF; 307/261, 210; 328/34

[56] References Cited
U.S. PATENT DOCUMENTS

| | | | |
|---|---|---|---|
| 3,223,929 | 12/1965 | Hofstad et al. | 307/261 |
| 3,569,841 | 3/1971 | Richman | 307/261 |
| 3,584,237 | 6/1971 | Stephens | 307/261 |

Primary Examiner—Douglas W. Olms
Attorney, Agent, or Firm—Neil B. Schulte

[57] ABSTRACT

An adapter circuit for converting dialing generated tone bursts on a telephone line into DC pulses of a length equal to the tone burst length so that the percent break may be measured. The DC pulse is initiated when the tone burst reaches 50% of its full value and terminated when the tone burst decays to 50% of its full value.

12 Claims, 3 Drawing Figures

4,082,920

TELEPHONE TESTING EQUIPMENT

BACKGROUND OF THE INVENTION

The prior art includes telephone circuit testing equipment for measuring the percent break of DC dialing equipment. When a telephone is dialed the circuit is broken a number of times corresponding to the number being dialed. The length of the break divided by the total time between the start of subsequent breaks is defined as the percent break. It is important that this ratio be maintained within predetermined limits to insure proper operation of the switching relays in the telephone circuits. Accordingly, the industry has developed testing equipment which measures the duration of these breaks in the DC current to provide an indication of this ratio.

With the advent of modern telephone signaling systems it has become common to use each of the breaks in the dial sequence to generate an AC tone burst of duration equal to that of the break. The tone bursts are easier to transmit over long distances and more easily identifiable to the switching equipment. However, after a tone burst passes through the various filters, transformers, and other electronic telephone circuits, its shape is modified so that it is difficult to positively identify the start and the end of the pulse. Thus, it is difficult to measure the length of the tone burst pulse and determine the percent break. My invention overcomes this problem as described hereinafter.

SUMMARY OF THE INVENTION

Briefly, the present invention contemplates an adapter which converts AC tone bursts into DC pulses which can then be directed to a conventional percent break tester of the type well known to those skilled in the art. Each tone burst grows exponentially from zero to its full value according to the formula:

$$A_{max}(1 - e^{-t/RC})$$

in which:
$A_{max}$ = full peak amplitude
$t$ = time
$RC$ = time constant.

When the burst is terminated it also decays exponentially to zero according to the formula:

$$A_{max}(e^{-t/RC}).$$

The specific time at which the AC tone burst reaches its full value at the start, or reaches zero after termination, is somewhat indefinite and extremely difficult to determine. However, the time it takes for the pulse to reach 50% of its full value after initiation is approximately identical to the time it takes for the pulse to decay to 50% of its full value after termination. My invention takes advantage of this mathematical fact by generating DC pulses of a length corresponding to the time between when the tone burst reaches 50% of its average full value and when it decays to 50% of its full value. This duration is the same as that of the original DC pulse which created the tone burst and therefore will provide a highly accurate measure of the percent break.

It may therefore be seen that it is an object of my invention to provide an improved adapter circuit for telephone testing equipment which converts AC tone bursts to DC pulses of equal duration. Further objects and advantages will become apparent from the following detailed description and drawings.

DESCRIPTION OF THE PREFERRED EMBODIMENT

Figure 1:
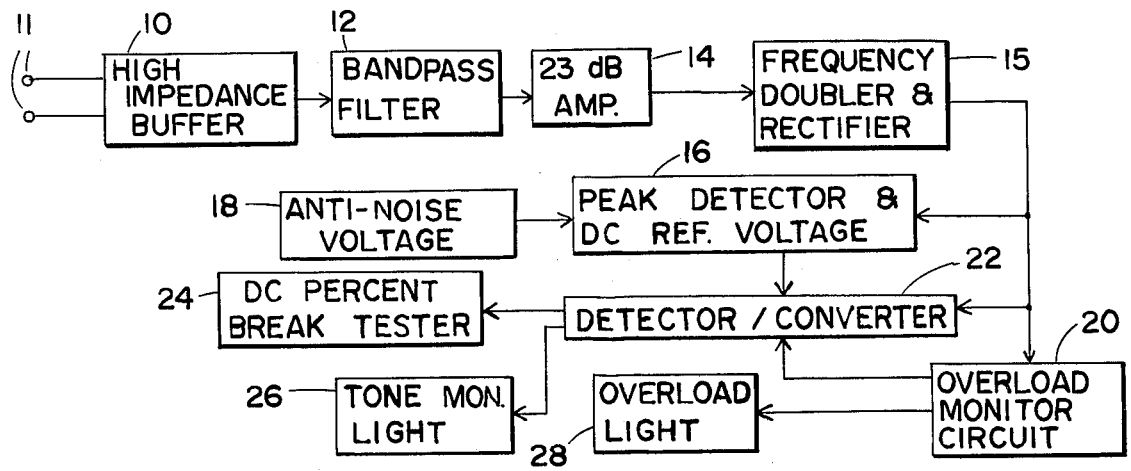
FIG. 1 is a schematic block diagram of the adapter circuit of the present invention.

Referring to FIG. 1, the AC tone burst to DC pulse converter of the present invention is shown schematically. The signal on the telephone line is received over leads 11 by a high impedance buffer 10 which prevents the line from being loaded by the test equipment. The signal passes through a bandpass filter 12 to an amplifier 14 which may be used to adjust the gain by 23 dB if desired. The signal is then presented to a frequency doubler and rectifier 15 which changes the tone burst from 2600 Hz to 5200 Hz. This increase in frequency reduces the time between successive positive going pulses which increases the accuracy of determining when the pulse first exceeds the 50% level and first drops below the 50% level. Rectifier 15 changes the signal to a series of pulses. This series of pulses is directed to a peak detector and automatic DC reference voltage generator 16, an overload monitor circuit 20, and a detector/converter 22. Peak detector 16 establishes the peak voltage of the series of pulses and develops a DC reference voltage therefrom which is divided down to provide a reference voltage which is about 50% of the peak value. The 50% reference voltage is then used by detector/converter 22 as a standard from which to produce the DC pulses for a tester 24. Detector/converter 22 passes the DC pulses, which are the same length as the received tone bursts, into DC percent break tester 24. Tester 24 is of the same type normally used in the industry to measure the percent break of conventional DC pulses. Detector/converter 22 also operates a tone monitor light 26 whenever an AC tone burst or constant tone signal is being received. If the signal from rectifier 15 exceeds a predetermined value, overload monitor circuit 20 disables detector/converter 22 and indicates an overload condition by means of an overload monitor light 28.

Peak detector 16 is continuously supplied with a small offset voltage from anti-noise offset voltage generator 18 to prevent inadvertent triggering of detector/converter 22 when no tone signal is being received. The circuits of peak detector 16, offset voltage generator 18, overload monitor circuit 20, and detector 22 are more completely described with respect to FIG. 2.

Figure 2:
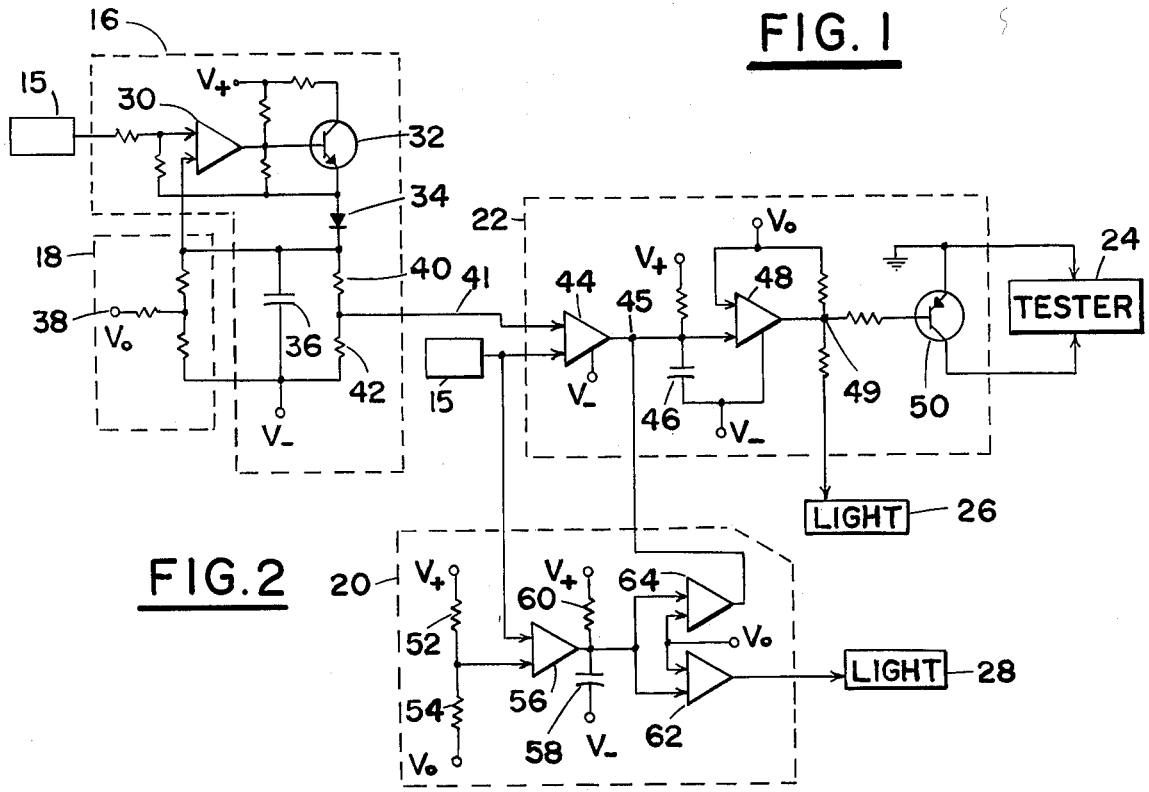
FIG. 2 is a more detailed schematic diagram of the novel circuits of FIG. 1.

Referring to FIG. 2, the frequency doubled and rectified tone burst is presented to a comparator 30 by rectifier 15. Each of the series of pulses from rectifier 15 operates comparator 30 which in turn operates a transistor 32 to charge a capacitor 36 through a diode 34. The voltage on capacitor 36 is coupled back to comparator 30. As long as the voltage of the incoming pulses is higher than the voltage on capacitor 36, comparator 30 continues to operate transistor 32 and charge capacitor 36. When the voltage on capacitor 36 rises to the peak level of the incoming pulses, that is to the instantaneous peak value of the tone burst, there is no longer any input voltage difference to comparator 30 and transistor 32 is no longer activated. Thus, capacitor 36 is held at the peak voltage of the tone burst. This voltage is divided down by a pair of resistors 40 and 42 to establish a 50% reference voltage on line 41 which is presented to a comparator 44 in detector and converter 22. The series of pulses from rectifier 15 is also presented to comparator 44.

Normally the voltage at point 45 is at $V_+$. This means that comparator 48 is operated and the voltage from point 49 is discharged to $V_-$ through comparator 48. This negative voltage at point 49 turns on transistor 50 presenting a DC signal to tester 24. If a rectified tone is received from rectifier 15 each pulse of the series that exceeds the 50% level, determined on line 41, triggers comparator 44 so as to discharge a capacitor 46 to $V_-$ through comparator 44. The pulses in the series recur often enough to maintain capacitor 46 discharged and, therefore, the voltage at point 45 low enough so that comparator 48 opens the circuit between point 49 and $V_-$. The voltage at point 49 rises, which turns off transistor 50, and creates the pulse break which can be measured by tester 24. The signal at point 49 is also coupled to tone monitor light 26 which turns on to indicate the reception of a tone or at least a tone frequency signal. At the end of the tone burst, the voltage of the series of pulses from rectifier 15 begins to decay exponentially. When the pulses drop below the 50% value comparator 44 again opens the circuit allowing capacitor 46 to charge up so that comparator 48 again discharges point 49 to $V_-$. Once again transistor 50 turns on to end the DC pulse break.

Over longer periods of time when no AC tone bursts or steady signals are received, capacitor 36 could discharge to zero so that the reference voltage on line 41 would approach zero. In this condition comparator 44 might be triggered by circuit noise. To prevent this a small anti-noise offset voltage is generated by generator 18. Voltage $V_O$ is presented to point 38 and through suitable resistors to maintain a small bias on line 41.

If the voltage of the AC tone signal exceeds a certain level the circuit will not operate properly due to saturation of the electronic components. To avoid this an overload monitor circuit 20 compares by means of a comparator 56 the tone burst voltage from rectifier 15 with a predetermined voltage established by a resistor bridge formed from two resistors 52 and 54. Tone burst voltages exceeding the predetermined level operate comparator 56 to discharge a capacitor 58. Resistor 60 is chosen to be large enough to produce a long time constant in the recharging circuit so the voltage on capacitor 58 stays low for a long enough period of time to exceed the length of a tone burst. This voltage on capacitor 58 operates a pair of comparators 62 and 64. Comparator 62 operates the overload monitor light 28 to indicate to the technician that an overload condition exists. Comparator 64 discharges point 45 to $V_-$ to prevent the operation of the detector and converter circuit 22 during the overload condition.

Figure 3:
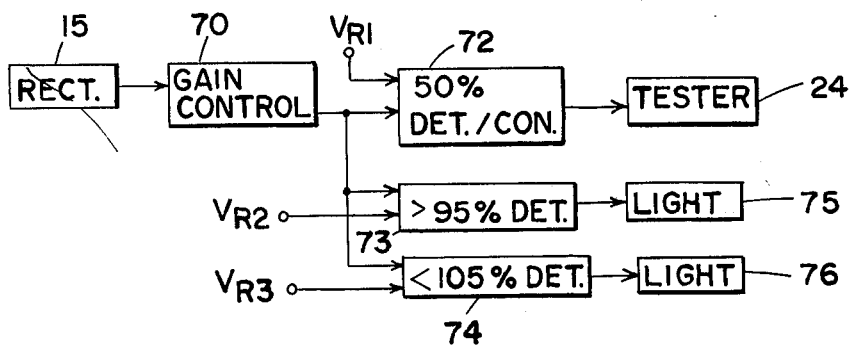
FIG. 3 is a schematic diagram of another embodiment.

A variation of the circuit is shown in FIG. 3 where the 50% trigger level is established by adjusting the signal level relative to fixed reference voltages. A manual gain control 70 is adjusted by the technician to vary the signal from rectifier 15 until it is twice the value of the fixed 50% trigger reference voltage $V_{R1}$. Thus, when the signal is presented to detector/converter 72, which may be similar to detector 22, the output to tester 24 comprises DC pulses of the correct length as before. A pair of detectors 73 and 74 are also connected to receive the signal and compare it to fixed reference voltages $V_{R2}$ and $V_{R3}$. Detector 73 operates a light 75 when the amplitude exceeds 95% of the full desired value while detector 74 operates a light 76 when the amplitude is less than 105% of the full value. The technician adjusts the gain until both lights are on in order to present a signal of about 100% value to detector/converter 72. Of course, several other variations in the circuit are possible without departing from the scope and spirit of the invention and therefore I intend to be limited only to the appended claims.

I claim:

1. An adapter for converting AC tone bursts to DC pulses of length generally equal to the length of the tone burst comprising:

input means adapted to receive the tone bursts;

reference means operable to generate a reference voltage of about half the magnitude of the average peak voltage of the tone bursts;

detecting means connected to said input means and said reference means and operable to detect when the voltage of said tone bursts exceeds said reference voltage; and DC output switching means connected to said detecting means and operable in response to said detecting means to break said DC output substantially from the time when the tone burst first exceeds said reference voltage to the time when the tone burst last falls below said reference voltage.

2. The circuit of claim 1 in which said reference means comprises a peak detector circuit connected to the input means to measure the average peak voltage of the tone burst and a voltage divider circuit connected to the peak detector to produce the reference voltage.

3. The circuit of claim 1 in which said DC output switching means comprises a transistor and said detecting means comprises a comparator with a capacitive feedback connected to operate said transistor.

4. The circuit of claim 3 in which said reference means comprises a peak detector circuit connected to the input means to measure the average peak voltage of the tone burst and a voltage divider circuit connected to the peak detector to produce the reference voltage.

5. The circuit of claim 4 including a bias voltage generator connected to said comparator to prevent said comparator from being operated by noise signals when no tone burst signal is being received.

6. The circuit of claim 4 including an overload monitor circuit connected to said input circuit and to said comparator so as to disable the detecting means when a tone burst of magnitude exceeding a predetermined level is received.

7. The circuit of claim 4 in which said input means comprises a filter means, amplifying means, and rectifying means.

8. The circuit of claim 7 including an overload monitor circuit connected to said input circuit and to said comparator so as to disable the detecting means when a tone burst of magnitude exceeding a predetermined level is received.

9. The circuit of claim 8 including a bias voltage generator connected to said comparator to prevent said comparator from being operated by noise signals when no tone burst signal is being received.

10. The circuit of claim 9 in which said input means also includes frequency doubling means.

11. The circuit of claim 1 in which said reference means comprises fixed voltage sources and including means to adjust the signal level to a level of about twice said fixed sources.

12. The circuit of claim 11 in which said DC output switching means comprises a transistor and said detecting means comprises a comparator connected to operate said transistor.

* * * * *